United States Patent
Coleman

[11] Patent Number: 5,193,864
[45] Date of Patent: Mar. 16, 1993

[54] SPLIT LOCK RING FOR BULK MATERIAL CONTAINER

[76] Inventor: Clarence B. Coleman, 2401 Merced St., San Leandro, Calif. 94577

[21] Appl. No.: 705,953

[22] Filed: May 28, 1991

[51] Int. Cl.$^5$ .................................................. B65D 7/02
[52] U.S. Cl. ................................ 292/256.67; 403/344
[58] Field of Search .................. 403/344; 24/279–286; 292/256.67, 256.69; 220/5 R, 5 A

[56] References Cited

U.S. PATENT DOCUMENTS

| | | | |
|---|---|---|---|
| 519,312 | 5/1894 | Arthur | 24/282 |
| 620,623 | 3/1899 | Weissenthanner | 292/256.69 X |
| 1,482,049 | 1/1924 | Swanson | 220/24 |
| 1,487,903 | 3/1924 | Vitele | 24/281 |
| 1,502,031 | 7/1924 | Gray | 24/281 X |
| 1,826,947 | 10/1931 | Nelson | 220/321 |
| 1,901,699 | 3/1933 | Burpee | 220/61 SR |
| 1,970,078 | 8/1934 | Dillon | 285/194 |
| 2,191,975 | 2/1940 | Stephens | 220/321 |
| 2,351,484 | 6/1944 | Carpenter | 220/47 |
| 2,404,777 | 7/1946 | Gaines | 220/46 |
| 2,697,570 | 12/1954 | Snyder | 248/2 |
| 2,801,764 | 8/1957 | Russell et al. | 220/46 |
| 2,895,748 | 7/1959 | Oldham | 285/410 |
| 4,133,442 | 1/1979 | Wiltshire et al. | 220/5 R |
| 4,135,657 | 1/1979 | Benson et al. | 229/5.7 |
| 4,219,125 | 8/1980 | Wiltshire et al. | 220/5 A |
| 4,532,800 | 8/1985 | Coleman | 73/308 |
| 4,552,090 | 11/1985 | Coleman | 116/204 |
| 4,606,111 | 8/1986 | Okazaki et al. | 29/463 |
| 4,768,675 | 9/1988 | Coleman | 220/203 |
| 4,792,056 | 12/1988 | Tiernan | 220/320 |

Primary Examiner—Richard E. Moore

[57] ABSTRACT

A split lock ring for securing a top plate or the like to a bulk material container. The split lock ring includes a segmented body with pairs of confronting ends. A chain hinge is secured to the confronting ends of one pair of confronting ends. A lug and bolt locking arrangement is secured to the confronting ends of another pair of confronting ends. In a modification of the split lock ring, a flexible circumferential band hinge is secured to a segmented body having pairs of confronting ends. The flexible circumferential band hinge is secured to the segmented body about the circumference of the segmented body and overlies one pair of confronting ends. The flexible circumferential band hinge extends over an angular distance of approximately 290°. In still another modification of the split lock ring, a segmented body includes three curved segments forming three pairs of confronting ends. Spaced flexible curved band hinges are secured to the segmented body about the circumference thereof to overlie respectively the remaining pairs of confronting ends.

11 Claims, 4 Drawing Sheets

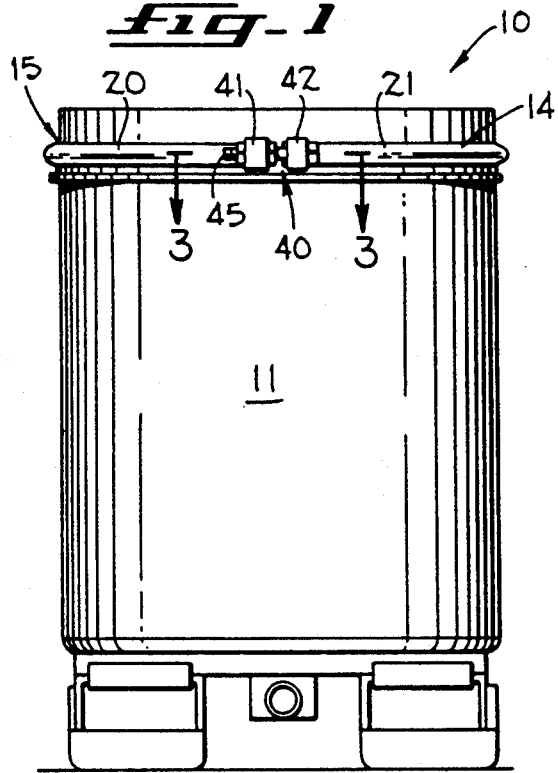
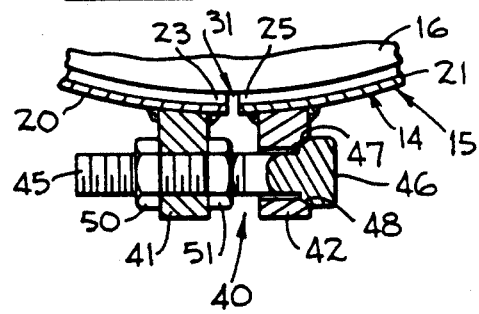
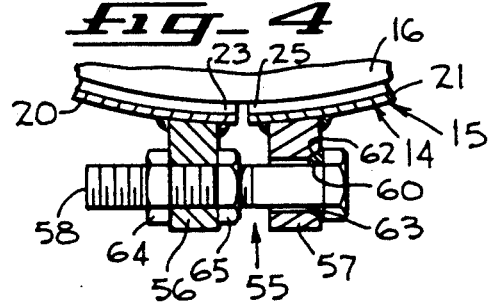
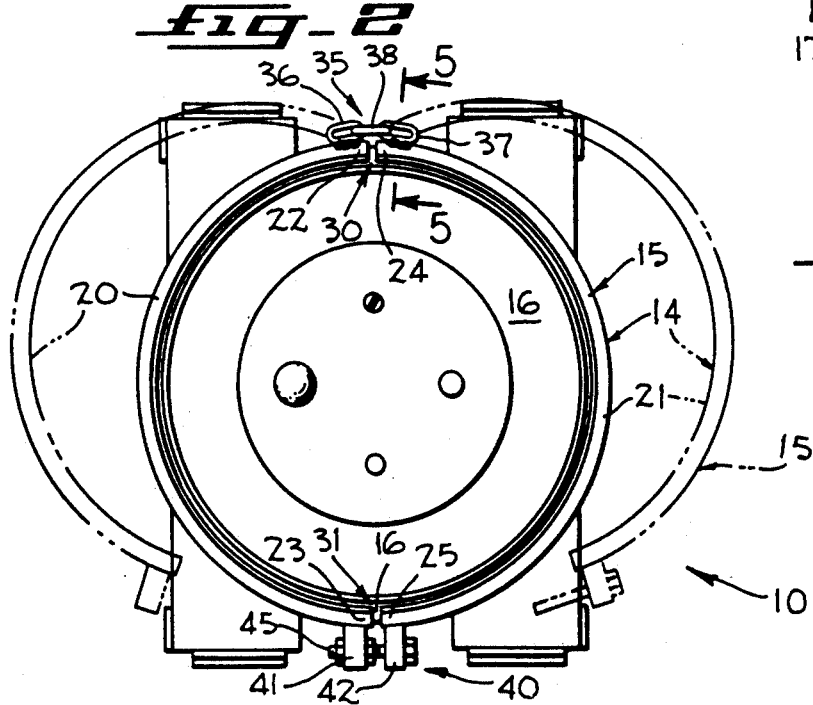
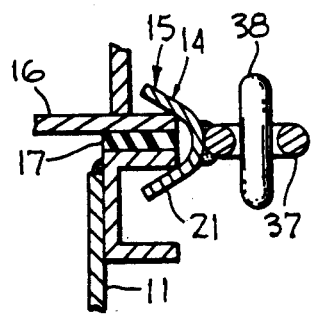

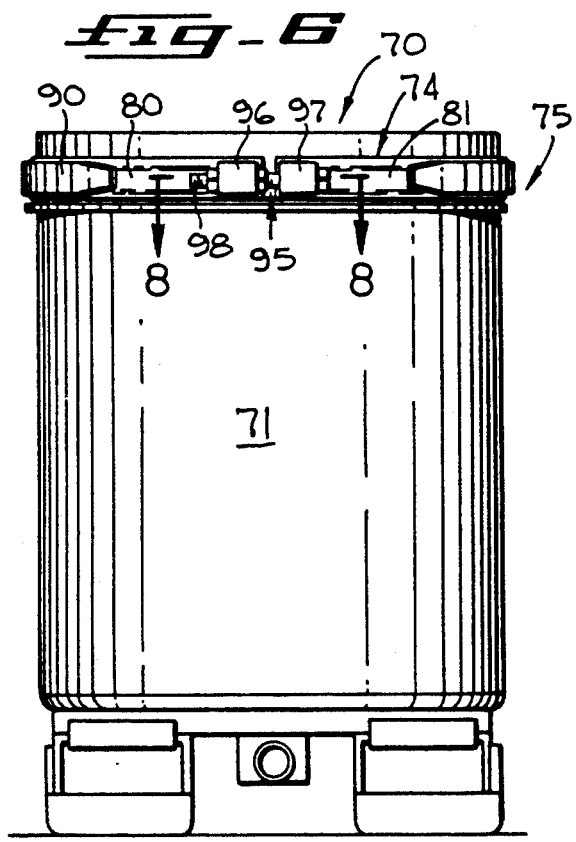
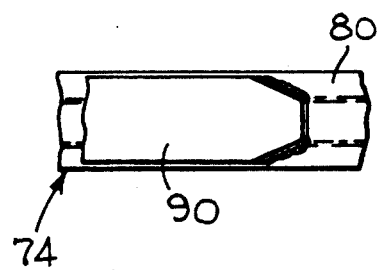
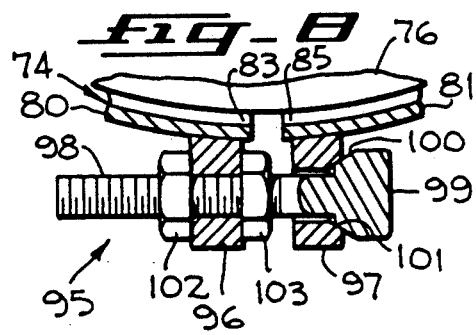
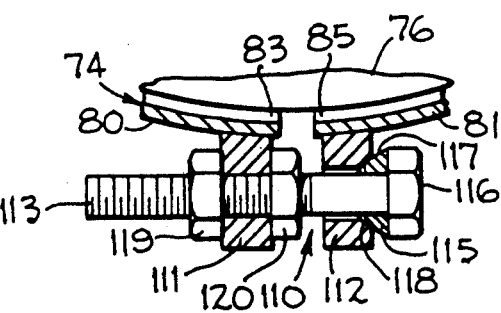
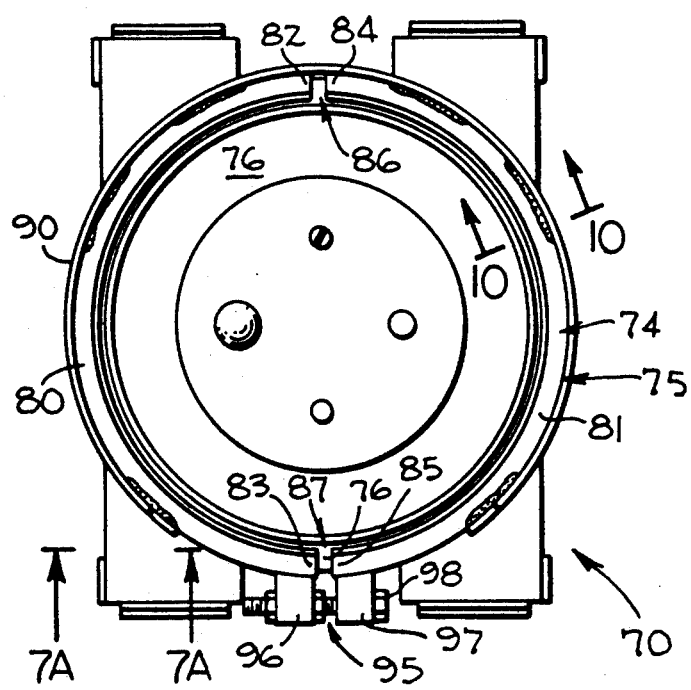
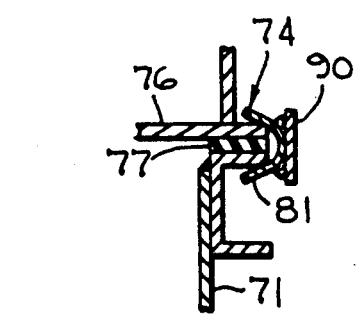

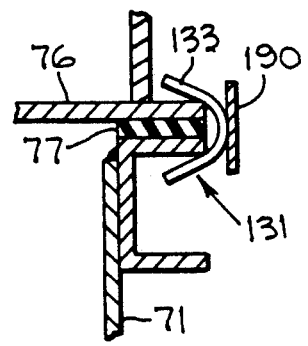
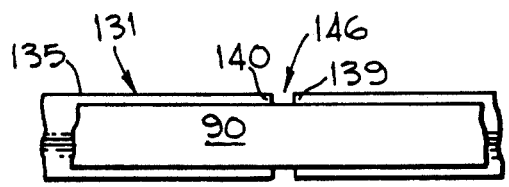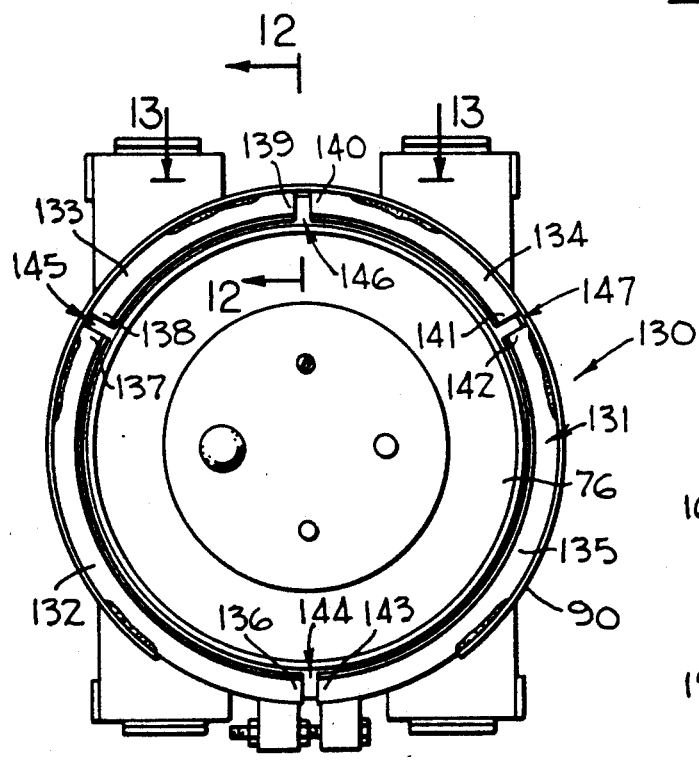

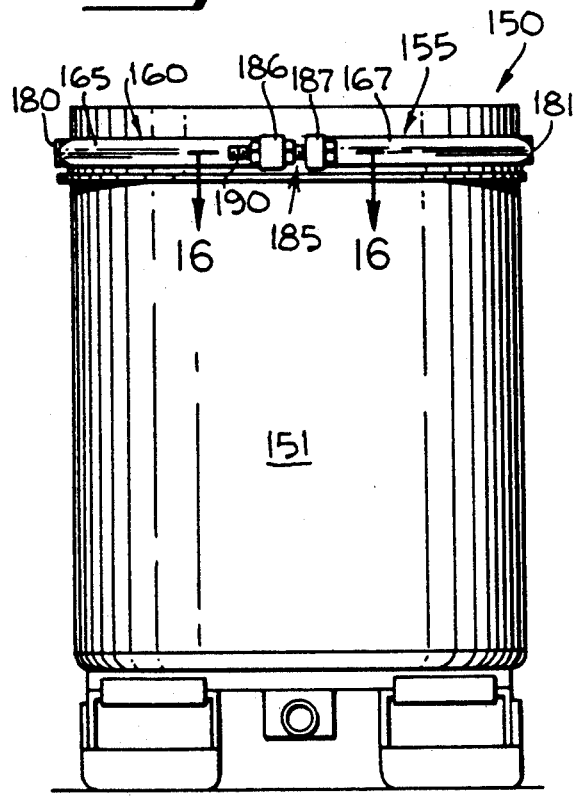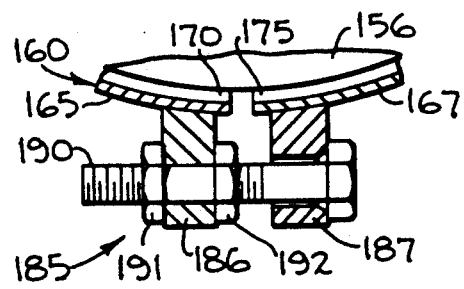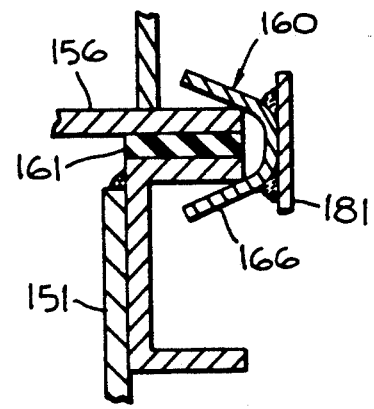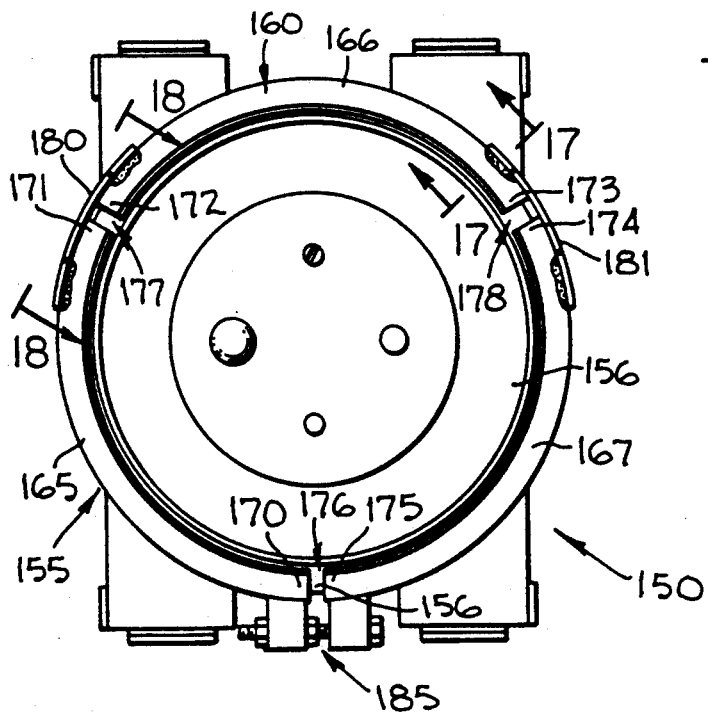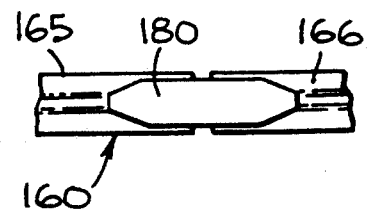

SPLIT LOCK RING FOR BULK MATERIAL CONTAINER

BACKGROUND OF THE INVENTION

The present invention relates in general to look rings for removably securing a stacking ring, cover or a top plate to a bulk material container, and more particularly to a split lock ring for removably securing a stacking ring, cover or top plate to a bulk material container.

Heavy gauge split lock rings have been heretofore employed to securely lock a stacking ring, cover or top plate to a bulk material container by a bolt and lug arrangement. Heretofore, a lever-type, spring snap-on arrangement was employed in conjunction with the bolted lock arrangement to secure a two segment or a three segment lock ring to the bulk material container. A band encircling the split segments was secured to the lever-type locking arrangement. Such lock arrangements were difficult to slip over the bulk material container and were difficult to snap on about the top of the bulk material container. Additionally, the diameter of the lock ring had a tendency to stretch. As a consequence thereof, the bolts did not fit properly to establish the desired close alignment for the confronting separable ends of the lock ring.

The Coleman U.S. Pat. No. 4,552,090, issued on Nov. 12, 1985, for a Bulk Material Container With A Rigid Follower discloses a bulk material container. A split ring retainer is bolted at diametrically opposite locations to secure the split ring retainer to the bulk material container for holding a top plate at the upper section of the bulk material container.

In the Wiltshire et al., U.S. Pat. No. 4,133,442, issued on Jan. 9, 1979, there is disclosed a two segment lock ring for a tank. At one pair of confronting ends of the lock ring is a flexible strip hinge. The hinge is welded to one pair of confronting ends of the lock ring. At the other pair of confronting ends of the lock ring is a bolted lock arrangement. A threaded bolt of the lock arrangement is received by confronting lugs at the confronting free ends of the lock ring.

In the U.S. Pat. No. 2,697,570, to Snyder, issued on Dec. 21, 1954, for Quick-Attaching Device, there is disclosed a split clamping ring and a draw bolt assembly for the clamping ring. A pair of brackets are secured over the confronting free ends of the split ring. Each bracket has an upstanding hollow head. Each hollow head has a tapered bore and concave recesses in the outer face thereof. A draw bolt is received by the tapered bores and the concave recesses of the hollow heads. The hollow head or the draw bolt forms an end abutment for a washer having a concave face to seat in the concave recess of one of the hollow heads. A nut on the draw bolt has a concave end face seated in the concave recess of the other hollow head. The concave recesses and the tapered bores enable a tangential pull to be exerted on the clamping ring.

The U.S. Pat. No. 4,606,111, to Okazaki et al., issued on Aug. 19, 1986, for Method of Manufacturing Undetachable Flange Joint, discloses anundetachable split ring to be used as a clamping device for a supercharger to be mounted on an internal combustion engine. The split ring comprises two segments. Confronting ends of the segmented split ring are angularly disposed and extend outwardly. A chain link fits over the associated pair of angularly and outwardly confronting ends.

The U.S. Pat. No. 2,191,975, to Stephens, issued on Feb. 27, 1940, for Pressure Cooker, and the patent to Burpee, No. 1,901,699, issued on Mar. 14, 1933, for Cover Clamp For Pressure Cooking Vessels, disclose a pressure cooker in which a cover is detachably secured to a cooking vessel. The cover includes a split ring and a band fixed to the outer wall of the split ring. The confronting ends of the band are secured to a toggle clamp so as to be drawn together at the confronting ends of the band by the toggle switch.

The U.S. Pat. No. 4,219,125, to Wiltshire et al., issued on Aug. 26, 1980, for Tank Closure Assembly, discloses a split ring closure in which one pair of confronting ends of a split ring are hinged together by a flexible strip hinge. The other pair of confronting ends of the split ring are bolted together by a bolt and U-shaped elements welded on the other pair of confronting ends.

In the U.S. Pat. No. 1,826,947, to Nelson, issued on Oct. 31, 1931, for Pressure Cooker, there is disclosed a three segment clamping ring. Two confronting ends of the clamping ring are hinged together. The remaining confronting ends are releasably secured together by a bolt arrangement.

In the U.S. Pat. No. 2,895,748, to Oldham, issued on July 21, 1959, for Band Type Clamp For Flanged Pipes, there is disclosed a chain clamp. A pair of confronting free ends of the chain clamp are releasably secured together by a bolt arrangement. A half round end of the bolt enters a nut in a half round socket in a lug.

The U.S. Pat. No. 2,801,764, to Russell, et al., issued on Aug. 6, 1957, for Sealing Structure discloses a segmented clenching band. A lug and bolt locking arrangement joins one pair of confronting ends of the segmented clenching band. The other pairs of confronting ends of the segmented clenching band are joined by respective curved links.

SUMMARY OF THE INVENTION

A lock ring for releasably securing a stacking ring, cover, top plate or the like to a bulk material container. The lock ring is segmented and comprises a plurality of pairs of confronting ends. One pair of confronting ends of the lock ring is connected by a chain hinge having a plurality of links. Opposite ends of the chain hinge are secured to the confronting ends, respectively, of the one pair of confronting ends. Another pair of confronting ends of the lock ring is releasably secured by locking means, which is connected to the confronting ends of the other pair of confronting ends.

A lock ring for releasably securing a stacking ring, cover, top plate or the like to a bulk material container. The lock ring is segmented and comprises a plurality of pairs of confronting ends. Opposite ends of the chain hinge are secured to the confronting ends, respectively, of one pair of confronting ends. A bolt and lug arrangement is releasably secured to the confronting ends of another pair of confronting ends of the lock ring. The head of the bolt, or a washer adjacent the head of the bolt, is bevelled and the lug is bevelled so that the drawing of the bolt and lug toward one another provides a guided wedging action with a resultant tangential alignment movement between the confronting ends of the other pair of confronting ends.

A lock ring for releasably securing a stacking ring, cover, top plate or the like to a bulk material container. The lock ring is segmented and comprises a plurality of pairs of confronting ends. A flexible band is secured to the lock ring and extends about the circumference of the lock ring at least an angular distance of 180°. The band extends over confronting ends of one pair of confronting ends of the lock ring. Another pair of confronting ends of the lock ring is releasably secured by locking means which is connected to the confronting ends of the other pair of confronting ends. The flexible band is not affixed to the locking means.

A lock ring for releasably securing a stacking ring, cover, top plate of the like to a bulk material container. The lock ring is split into at least three segments and comprises at least three pairs of confronting ends. A pair of confronting ends of the lock ring is releasably secured by locking means which is connected to the confronting ends of one pair of confronting ends. A flexible band is provided for each of the remaining pairs of confronting ends of the lock ring, respectively. Each flexible band is secured to the confronting ends of its associated pair of confronting ends.

An object of the present invention is to facilitate the installation of a split lock ring for releasably securing a stacking ring, cover, top plate or the like to a bulk material container.

Another object of the present invention is to provide a split locking ring for a bulk material container that is relatively easy to slip over a bulk material container and is relatively easy to releasably secure the top plate cover or stacking ring to the upper section of the bulk material container.

Another object of the present invention is to provide a split locking ring in which the tension during the securing of a stacking ring, cover, top plate or the like is carried substantially by the body of the lock ring rather than by the flexible band.

A feature of the present invention is the lessening of a spring effect in the positioning of a split lock ring on a bulk material container while providing a guided wedge effect in the locking enclosure for the split ring resulting in a tangential alignment movement between confronting ends of a pair of confronting ends of the split lock ring.

Another feature of the present invention is the reduction of a spring effect in the positioning of a split lock ring on a bulk material container by the employment of a hinge connection between confronting ends of one pair of confronting ends of the split ring and the provision of a guided wedging action by a locking arrangement for tangentially aligning the confronting ends of another pair of confronting ends of the lock ring while maintaining the bolt of the locking arrangement in close fit to the annular segmented body of the split lock ring.

Another feature of the present invention is the employment of a locking arrangement for a split locking ring in which there is a spring activated pressure release mechanism.

Another feature of the present invention is the employment of a locking arrangement for a split locking ring in which the entire locking bolt is removable to allow expansion of the split lock ring for ease in application and locking nuts are employed to set the locking bolt at the desired tension for securing a stacking ring, cover, top plate or the like to the shell of a bulk material container.

BRIEF DESCRIPTION OF THE DRAWINGS

FIG. 1 is an elevation view of a bulk material container employing a split lock ring with a chain hinge embodying the present invention.

FIG. 2 is a top view of the bulk material container shown in FIG. 1 employing the split lock ring shown in FIG. 1.

FIG. 3 is an enlarged fragmentary horizontal sectional view taken along line 3—3 of FIG. 1 to illustrate a bolt and lug locking arrangement for the split lock ring shown in FIGS. 1 and 2.

FIG. 4 is an enlarged fragmentary horizontal sectional view taken along line 3—3 of FIG. 1 to illustrate a modified bolt and lug locking arrangement for the split lock ring shown in FIGS. 1 and 2.

FIG. 5 is an enlarged fragmentary vertical sectional view taken along line 5—5 of FIG. 2 to illustrate the chain hinge for the split lock ring shown in FIGS. 1 and 2.

FIG. 6 is an elevation view of a bulk material container employing a split lock ring with a circumferential flexible band hinge embodying the present invention.

FIG. 7 is a top view of the bulk material container shown in FIG. 6 employing the split lock ring shown in FIG. 6.

FIG. 7A is an enlarged fragmentary plan view of the flexible circumferential hinge for the split lock ring shown in FIGS. 6 and 7 taken along line 7A—7A of FIG. 7.

FIG. 8 is an enlarged fragmentary horizontal sectional view taken along line 8—8 of FIG. 6 to illustrate a bolt and lug locking arrangement for the split lock ring shown in FIGS. 6 and 7.

FIG. 9 is an enlarged fragmentary horizontal sectional view taken along line 8—8 of FIG. 6 to illustrate a modified bolt and lug locking arrangement for the split lock ring shown in FIGS. 6 and 7.

FIG. 10 is an enlarged fragmentary, vertical sectional view taken along line 10—10 of FIG. 7 to illustrate the circumferential flexible band hinge for the split lock ring shown in FIGS. 6 and 7.

FIG. 11 is a top view of a bulk material container employing a split lock ring that is a modification of the split lock ring shown in FIGS. 6 and 7 to illustrate a four segment split lock ring with a circumferential flexible band hinge.

FIG. 12 is an enlarged fragmentary sectional view taken along line 12—12 of FIG. 11 to illustrate the circumferential flexible band hinge for the split lock ring shown in FIG. 11.

FIG. 13 is an enlarged fragmentary plan view taken along line 13—13 of FIG. 11 to illustrate the flexible band hinge for the split lock ring shown in FIG. 11.

FIG. 14 is an elevation view of a bulk material container employing a split lock ring with angularly spaced flexible band hinges embodying the present invention.

FIG. 15 is a top view of the bulk material container shown in FIG. 14 employing the split lock ring shown in FIG. 14.

FIG. 16 is an enlarged fragmentary horizontal sectional view taken along line 16—16 of FIG. 14 to illustrate a bolt and lug locking arrangement for the split lock ring shown in FIGS. 14 and 15.

FIG. 17 is an enlarged fragmentary vertical sectional view taken along line 17—17 of FIG. 15 to illustrate a flexible band hinge for the split lock ring shown in FIGS. 14 and 15.

FIG. 18 is an enlarged fragmentary plan view of the flexible band hinge for the split lock ring shown in FIGS. 14 and 15 taken along lines 18—18 of FIG. 15.

FIG. 19 is an enlarged fragmentary horizontal sectional view taken along line 16—16 of FIG. 14 to illustrate a bolt and lug locking arrangement for the split lock ring shown in FIGS. 14 and 15 that is a modification of the bolt and lug locking arrangement shown in FIG. 16.

DESCRIPTION OF THE PREFERRED EMBODIMENTS

Illustrated in FIGS. 1 and 2 is a well-known bulk material container 10. The bulk material container 10 comprises a shell 11, which, in the preferred embodiment, is made of mild steel. Shells of the type herein disclosed are made of mild steel, stainless steel, aluminum and other suitable material. A conventional top plate, cover and/or stacking ring is secured to the upper section of the shell 11 by a split locking ring 15 embodying the present invention. In the preferred embodiment, the top plate, cover or stacking ring is made of mild steel. It is well-known that the top plate, cover or stacking ring for a conventional bulk material container may be made from other suitable material, for example, plastic, fiber or stainless steel. In the exemplary embodiment, a top plate 16 is employed for purpose of a typical illustration. It is to be understood that the split lock ring 15 may be employed equally as well for the securement of a stacking ring or cover to the upper section of the shell 11. Various uses of a split locking ring are shown in U.S. Patent No. 4,532,800; No. 4,552,090; and No. 4,768,675.

The split lock ring 15, in the preferred embodiment, comprises an annular, segmented body 14 that is made of a heavy gauge steel. As shown in FIG. 5, the split lock ring body 14 has a generally concave, U-shaped or V-shaped configuration in cross-section with the open inner wall thereof receiving in clamping engagement the top plate 16, a gasket 17 and a flange welded to the upper section of the shell 11. In FIG. 2, it is shown that the split lock ring body 14 comprises arcuate segments 20 and 21. The segment 20 includes opposite ends 22 and 23 and the segment 21 includes opposite ends 24 and 25. The confronting ends 22 and 24 form a pair of confronting ends 30 for the split locking ring 15 and the confronting ends 23 and 25 form a pair of confronting ends 31 for the split locking ring 15.

Joining the ends 22 and 24 of the split lock ring body 14 is a chain hinge 35 of the split lock ring 15. In the exemplary embodiment, the chain hinge 35 is made of a carbon steel. In the preferred embodiment, the chain hinge 35 comprises at least three links. In the exemplary embodiment, the end links 36 and 37 of the chain hinge 35 are secured to the confronting ends 22 and 24 of the segments 20 and 21, respectively, by welding. A link 38 of the chain hinge 35 is linked to the outer links 36 and 37. A three link chain hinge provides a double hinge with reduced play in the tightened position and an increased play in the unlocked state of the split lock ring 15.

Joining the ends 23 and 25 of the split lock ring body 14 is a locking arrangement 40 for releasably locking the split lock ring 15. The locking arrangement 40 and the chain hinge 35 are diametrically opposite one another. The locking arrangement 40 comprises an internally threaded lug 41 that is welded or otherwise secured to the segment 20 in the vicinity of the end 23. The locking arrangement 40 comprises a lug 42 with an unthreaded bore that is welded or otherwise secured to the segment 21 in the vicinity of the end 25. Received by the lugs 41 and 42 is a bolt 45. The bolt 45 is in threaded engagement with the internally threaded lug 41. The head 46 of the bolt 45 is tapered at 47 in the direction facing the lug 42. The lug 42 is tapered in the direction of the bolt head 46 at 48. The tapers at 47 and 48 are conforming tapers. In the preferred embodiment, each bevel at 47 and 48 is at a 30° angle. Locking or retaining nuts 50 and 51 are threaded to the bolt 45 on opposite sides of the lug 41. The bolt 45 is removable in its entirety to allow expansion of the split lock ring 15 for ease in application. The locking nuts 50 and 51 are employed to set the bolt 45 at the desired tension for securing the top plate 16 to the shell 11 of the bulk material container 10 when the ends 23 and 25 of the segments 20 and 21, respectively, are properly aligned.

To remove the top plate 16 from the upper section of the shell 11, the bolt 45 is rotated in a direction to increase the space between the lugs 41 and 42. When there is sufficient space between the lugs 41 and 42, the split lock ring 15 is removed from the upper section of the shell 11 and the top plate 16 is thereupon removed. To removably secure the top plate 16 to the upper section of the shell 11, the top plate 16 is placed on the upper section of the shell 11. Thereupon, the split lock ring 15 is placed on the upper section of the shell 11 so that the open inner wall of the split lock ring body 14 receives in clamping engagement the top plate 16, the gasket 17 and the flange welded to the upper section of the shell 11. The bolt 45 is rotated to draw the lugs 41 and 42 toward one another. When the lug 42 and the bolt head 46 are drawn into engagement with one another, the taper 47 of the bolt head 46 engages the confronting taper 48 of the lug 42 to provide a guided wedging action and a tangential alignment movement between the ends 23 and 25 of the segments 20 and 21, respectively. As a result thereof, the bolt 45 is in a close fit with the split lock ring body 14. Once the ends 23 and 25 of the segments 20 and 21, respectively, are properly aligned, the lock nuts 50 and 51 are adjusted to set the bolt 45 for the desired tension for the split lock ring 15.

Illustrated in FIG. 4 is a locking arrangement 55 which is a modification of the locking arrangement shown in FIG. 3. The locking arrangement 55 joins the ends 23 and 25 of the split lock ring body 14 for releasably securing the lock ring 15. The locking arrangement 55 comprises an internally threaded lug 56 that is welded or otherwise secured to the segment 20 in the vicinity of the end 23. The locking arrangement 55 comprises a lug 57 with an unthreaded bore that is welded or otherwise secured to the segment 21 in the vicinity of the end 25. Received by the lugs 56 and 57 is a bolt 58. The bolt 58 is in threaded engagement with the internally threaded lug 56.

A washer 60 disposed adjacent a head 61 of the bolt 58 is tapered at 62 in the direction of the lug 57. The lug 57 is tapered in the direction of the washer 60 at 63. The tapers at 62 and 63 are conforming tapers. In the preferred embodiment, each bevel at 62 and 63 is at a 30° angle. Locking or retaining nuts 64 and 65 are threaded to the bolt 58 at opposite sides of the lug 56. The bolt 58 is removable in its entirety to allow expansion of the split lock ring 15 for ease in application. The locking nuts 64 and 65 are employed to set the bolt 58 at the desired tension for securing the top plate 16 to the shell 11 of the bulk material container 10 when the ends 23 and 25 of the segments 20 and 21, respectively, are properly aligned.

To remove the top plate 16 from the upper section of the shell 11, the bolt 58 is rotated in a direction to increase the space between the lugs 56 and 57. When there is sufficient space between the lugs 56 and 57, the split lock ring 15 is removed from the upper section of the shell 11 and the top plate 16 is thereupon removed. To removably secure the top plate 16 to the upper section of the shell 11, the top plate 16 is placed on the upper section of the shell 11. Thereupon, the split lock ring 15 is placed on the upper section of the shell 11 so that the open inner wall of the split lock ring body 14 receives in clamping engagement the top plate 16, the gasket 17 and the flange welded to the upper section of the shell 11. The bolt 58 is rotated to draw the lugs 56 and 57 toward one another. When the lug 63, the washer 60 and the bolt head 61 are drawn into successive engagement, the taper 62 of the washer 60 engages the taper 63 of the lug 62 to provide a guided wedging action and a tangential alignment movement between the ends 23 and 25 of the segments 20 and 21, respectively. As a result thereof, the bolt 58 is in close fit with the split lock ring body 14. Once the ends 23 and 25 of the segments 20 and 21, respectively, are properly aligned, the lock nuts 64 and 65 are adjusted to set the bolt 58 for the desired tension for the split lock ring 15.

Illustrated in FIGS. 6 and 7 is a well-known bulk material container 70. The bulk material container 70 comprises a shell 71, which, in the preferred embodiment, is made of mild steel. Shells of the type herein disclosed are made of mild steel, stainless steel and aluminum and other suitable material. A conventional top plate, cover and/or stacking ring is secured to the upper section of the shell 71 by a split lock ring 75 embodying the present invention. In the preferred embodiment, the top plate, cover or stacking ring is made of mild steel. It is well-known that the top plate, cover or stacking ring for a conventional bulk material container may be made from other suitable material, for example, plastic, fiber or stainless steel. In the exemplary embodiment, a top plate 76 is employed for purpose of a typical illustration. It is to be understood that the split lock ring 75 may be employed equally as well for the securement of a stacking ring or cover to the upper section of the shell 71. Various uses of a split lock ring are shown in U.S. Pat. No. 4,532,800; No. 4,552,090; and No. 4,768,675.

The split lock ring 75, in the preferred embodiment, comprises a segmented annular body 74 that is made of a heavy gauge steel. As shown in FIG. 10, the split lock ring body 74 has a generally concave, U-shaped or V-shaped configuration in cross-section with the open inner wall thereof receiving in clamping engagement the top plate 76, a gasket 77 and a flange welded to the upper section of the shell 71. In FIG. 7, it is shown that the split lock ring body 74 comprises arcuate segments 80 and 81. The segment 80 includes opposite ends 82 and 83 and the segment 81 includes opposite ends 84 and 85. The confronting ends 82 and 84 form of a pair of confronting ends 86 for the split lock ring 75 and the confronting ends 83 and 85 form a pair of confronting ends 87 for the split lock ring 75. The pairs of confronting ends 86 and 87 are diametrically opposite one another.

Interconnecting the confronting ends 82 and 84 of the split lock ring body 74 is a flexible circumferentially disposed arcuate band hinge 90 that extends an angular distance approximately 290° about the circumference of the split lock ring body 74. In the preferred embodiment, the flexible circumferential band hinge 90 is made of 12 gauge or heavier stainless steel. The flexible circumferential band hinge 90 is fixedly secured to the split lock ring body 74 by welding, or other suitable means.

In the exemplary embodiment, the space between the confronting ends 82 and 84 of the segment 80 and 81, respectively, is approximately ⅜ of an inch.

Joining the confronting ends 83 and 85 of the split lock ring body 74 is a locking arrangement 95 for releasably securing the split lock ring 75. In the preferred embodiment, the flexible circumferential band hinge 90 is not affixed to the locking arrangement 95. The locking arrangement 95 comprises an internally threaded lug 96 that is welded or otherwise secured to the segment 80 in the vicinity of the end 83. The locking arrangement 95 comprises a lug 97 with an unthreaded bore that is welded or otherwise secured to the segment 81 in the vicinity of the end 85. Received by the lugs 96 and 97 is a bolt 98. The bolt 98 is in threaded engagement with the internally threaded lug 96. The head 99 of the bolt 98 is tapered at 100 in the direction facing the lug 97. The lug 97 is tapered in the direction of the bolt head 99 at 101. The tapers 100 and 101 are conforming tapers. In the preferred embodiment, each bevel at 100 and 101 is at a 30° angle. Locking or retaining nuts 102 and 103 are threaded to the bolt 98 on opposite sides of the lug 96. The bolt 98 is removable in its entirety to allow expansion of the split lock ring 74 for ease in application. The locking nuts 102 and 103 are employed to set the bolt 98 at the desired tension for securing the top plate 76 to the shell 71 of the bulk material container 70 when the ends 83 and 85 of the segments 80 and 81, respectively, are properly aligned.

To remove the top plate 76 from the upper section of the shell 71, the bolt 98 is rotated in a direction to increase the space between the lugs 96 and 97. When there is sufficient space between the lugs 96 and 97, the split lock ring 75 is removed from the upper section of the shell 71 and the top plate 76 is thereupon removed. To removably secure the top plate 76 to the upper section of the shell 71, the top plate 76 is placed on the upper section of the shell 71. Thereupon, the split lock ring 75 is placed on the upper section of the shell 71 so that the open inner wall of the split lock ring body 74 receives in clamping engagement the top plate 76, the gasket 77, and the flange welded to the upper section of the shell 71. The bolt 98 is rotated to draw the lugs 96 and 97 toward one another. When the lug 97 and the bolt head 99 are drawn into engagement, the taper 100 of the bolt head 99 engages the confronting taper 101 of the lug 97 to provide a guided wedging action between the bolt 98 and the lug 97 and a tangential alignment movement between the confronting ends 83 and 85 of the segments 80 and 81, respectively. As a result thereof, the bolt 98 is in a close fit with the split lock ring body 74. Once the ends 83 and 85 of the segments 80 and 81, respectively, are properly aligned, the lock nuts 102 and 103 are adjusted to set the bolt 98 for the desired tension for the split lock ring 75.

Illustrated in FIG. 9 is a locking arrangement 110 which is a modification of the locking arrangement shown in FIG. 8. The locking arrangement 110 joins the confronting ends 83 and 85 of the split lock ring body 74 for releasably securing the split lock ring 75. The locking arrangement 110 comprises an internally threaded lug 111 that is welded or otherwise secured to the segment 80 in the vicinity of the end 83. The locking arrangement 110 comprises a lug 112 with an unthreaded bore that is welded or otherwise secured to the segment 81 in the vicinity of the end 85. Received by the lugs 111 and 112 is a bolt 113. The bolt 113 is in threaded engagement with the internally threaded lug 111. A washer 115 disposed adjacent a head 116 of the bolt 113 is tapered at 117 in the direction of the lug 112. The lug 112 is tapered in the direction of the washer 115 at 118. The tapers 117 and 118 are conforming tapers. In the preferred embodiment, each bevel at 117 and 118 is at a 30° angle. Locking or retaining nuts 119 and 120 are threaded to the bolt 113 at opposite sides of the lug 111. The bolt 113 is removable in its entirety to allow expansion of the split lock ring 75 for ease in application. The locking nuts 119 and 120 are employed to set the bolt 113 at the desired tension for securing the top plate 76 to the shell 71 of the bulk material container 70 when the ends 83 and 85 of the segments 80 and 81, respectively, are properly aligned.

To remove the top plate 76 from the upper section of the shell 111, the bolt 113 is rotated in a direction to increase the space between the lugs 111 and 112. When there is sufficient space between the lugs 111 and 112, the split lock ring 75 is removed from the upper section of the shell 71 and the top plate 76 is thereupon removed. To secure the top plate 76 to the upper section of the shell 71, the top plate 76 is placed on the upper section of the shell 71. Thereupon, the split lock ring 75 is placed on the upper section of the shell 71 so that the open inner wall of the split lock ring body 74 receives in clamping engagement the top plate 76, the gasket 77, and the flange welded to the upper section of the shell 71. The bolt 113 is rotated to draw the lugs 111 and 112 toward one another. When the lug 112, the washer 115 and the bolt head 116 are drawn into successive engagement, the taper 117 of the washer 115 engages the taper 118 of the lug 112 to provide a guided wedging action between the bolt 115 and the lug 112 and a tangential alignment movement between the confronting ends 83 and 85 of the segments 80 and 81, respectively. As a result thereof, the bolt 113 is in a close fit with the split lock ring body 74. Once the ends 83 and 85 of the segments 80 and 81, respectively, are properly aligned, the lock nuts 119 and 120 are adjusted to set the bolt 113 for the desired tension for the lock ring 75.

Illustrated in FIG. 11 is a split lock ring 130 that is a modification of the split lock ring 75 (FIGS. 6 and 7). The split lock ring 130 differs from the split lock ring 75 in that an annular segmented split lock ring body 131 comprises arcuate segments 132-135. The segment 132 includes opposite ends 136 and 137 and the segments 133 includes opposite ends 138 and 139. The segment 134 includes opposite ends 140 and 141 and the segment 135 includes opposite ends 142 and 143. The confronting ends 143 and 136 form a pair of confronting ends 144. The confronting ends 137 and 138 form a pair of confronting ends 145. The confronting ends 139 and 140 form a pair of confronting ends 146. The confronting ends 141 and 142 form a pair of confronting ends 147.

The segmented split lock ring body 131 is made of a heavy gauge steel and has a generally concave, U-shaped or V-shaped configuration in cross-section. The open inner wall of the split lock ring body 131 receives in clamping engagement the top plate 76, the gasket 77 and the flange welded to the upper section of the shell 71 (FIG. 12). In the exemplary embodiment, the space between each of the pairs of confronting ends 144-147 is ⅛ of an inch. The angular distance of the segments 133 and 134, respectively, is determined by the requirement for maintaining a predetermined diameter for the split lock ring body 131. In all other respects the split lock ring is similar in structure, operation and use to the split lock ring 75.

Illustrated in FIGS. 14 and 15 is a well-known bulk material container 150. The bulk material container comprises a shell 151, which, in the preferred embodiment, is made of mild steel. Shells of the type herein disclosed are made of mild steel, stainless steel, aluminum and other suitable material. A conventional top plate, cover and/or stacking ring is secured to the upper section of the shell by a split lock ring 155 embodying the present invention. In the preferred embodiment, the top plate, cover or stacking ring is made of mild steel. It is well-known that the top plate, cover or stacking ring for a conventional bulk material container may be made from other suitable material, for example, plastic, fiber or stainless steel. In the exemplary embodiment, a top plate 156 is employed for purpose of a typical illustration. It is to be understood that the split lock ring 155 may be employed equally as well for the securement of a stacking ring or cover to the upper section of the shell 151. Various uses of a split lock ring are shown in U.S. Pat. No. 4,532,800; No. 4,552,090; and No. 4,768,675.

The split lock ring 155, in the preferred embodiment, comprises an annular, segmented body 160 made of a heavy gauge steel. As shown in FIG. 17, the split lock ring body 160 has a generally concave, U-shaped or V-shaped configuration in cross-section with the open inner wall thereof receiving in clamping engagement the top plate 156, a gasket 161 and a flange welded to the upper section of the shell 151. In FIG. 15, it is shown that the split lock ring body 160 comprises arcuate segments 165-167. The segment 165 includes opposite ends 170 and 171, and the segment 166 includes opposite ends 172 and 173. The segment 167 includes opposite ends 174 and 175. The confronting ends 175 and 170 form a pair of confronting ends 176, and the confronting ends 171 and 172 form a pair of confronting ends 177 for the split lock ring 155. The confronting ends 173 and 174 form a pair of confronting ends 178 for the split lock ring 155.

Joining the confronting ends 171 and 172 of the split lock ring body 160 is a flexible arcuate band hinge 180 of the split lock ring 155. Joining the confronting ends 173 and 174 of the split lock ring body 160 is a flexible arcuate band hinge 181 of the split lock ring 155. In the exemplary embodiment, the flexible band hinge 180 and the flexible band hinge 181 are made of 12 gauge stainless steel. In the exemplary embodiment, the space between the confronting ends 171 and 172 is ⅛ of an inch. In the exemplary embodiment, the space between the confronting ends 173 and 174 is ⅛ of an inch. The flexible band hinge 180 is secured to the confronting ends 171 and 172 of the segments 165 and 166, respectively, by lap welding or other suitable means. In a like manner, the flexible band hinge 181 is secured to the confronting ends 173 and 174 of the segments 166 and 167, respectively, by lap welding or other suitable means. The flexible arcuate band hinges 180 and 181 are spaced angular distances apart.

Joining the confronting ends 170 and 175 of the segments 165 and 167, respectively, is a locking arrangement 185 for releasably locking the split lock ring 155. The locking arrangement 185 comprises an internally threaded lug 186 that is welded or otherwise secured to the segment 165 in the vicinity of the end 170. The locking arrangement 185 comprises a lug 187 with an unthreaded bore that is welded or otherwise secured to the segment 167 in the vicinity of the end 175. Received by the lugs 186 and 187 is a bolt 190. The bolt 190 is in threaded engagement with the internally threaded lug 186. Locking or retaining nuts 191 and 192 are threaded to the bolt 190 on opposite sides of the lug 186. The bolt 190 is removable in its entirety to allow expansion of the split lock ring 155 for ease in application. The locking nuts 191 and 192 are employed to set the bolt 190 at the desired tension for securing the top plate 156 to the shell 151 of the bulk material container 150.

To remove the top plate 156 from the upper section of the shell 151, the bolt 190 is rotated in a direction to increase the space between the lugs 186 and 187. When there is sufficient space between the lugs 186 and 187, the split lock ring 155 is removed from the upper section of the shell 151 and the top plate 156 is thereupon removed. To removably secure the top plate 156 to the upper section of the shell 151, the top plate 156 is placed on the upper section of the shell 151. Thereupon, the split lock ring 155 is placed on the upper section of the shell 151 so that the open inner wall of the split lock ring body 160 receives in clamping engagement the top plate 156, the gasket 161 and the flange welded to the upper section of the shell 151. The bolt 190 is rotated to draw the lugs 186 and 187 toward one another until the split lock ring 155 is secured to the bulk material container 150.

Illustrated in FIG. 19 is a locking arrangement 195, which is a modification of the locking arrangement 185 shown in FIG. 16. The locking arrangement 195 differs from the locking arrangement 185 in that a spring 196 is disposed between the lug 187 and the head 197 of the bolt 190. The spring 196, which is coiled around the stem of the bolt 190, serves as a pressure relief mechanism to provide a spring activated pressure release split lock ring. As the bolt 190 is rotated to draw the lugs 186 and 187 into closer proximity, the spring 196 is under compression. When the split lock ring 160 is subjected to excessive pressure in retaining the top plate 156 locked to the upper section of the bulk material container, excessive force is applied to the lug 187 in the direction of the bolt head 197. When the force applied to the lug 187 in the direction of the bolt head 197 exceeds a predetermined magnitude, the lug 187 moves in the direction of the bolt head 197 against the urgency of the spring 196. This action reduces the pressure on the split lock ring 160. Thus, the spring 196 serves as a relief mechanism and the split lock ring 160 is a spring activated pressure release split lock ring. The split lock ring 160 is used as a component of the pressure relief arrangement. When pressure on the top plate 156 exerts excessive pressure on the split lock ring 160, the excessive pressure is relieved by compression of the spring 196. The lock nuts 191 and 192 are adjusted for setting the spring tension.

What is claimed is:

1. A split lock ring for releasably securing a top plate, cover or stacking ring to the upper section of a bulk material container, said split lock ring comprising:
   (a) a split lock ring body comprising a plurality of arcuate segments, each of said arcuate segments having opposite ends, confronting opposite ends of successive arcuate segments of said arcuate segments providing a plurality of pairs of confronting ends;
   (b) a chain hinge fixedly secured to confronting ends of one pair of said pairs of confronting ends for providing a hinge for said split lock ring body at said one pair of confronting ends, said chain hinge comprising at least three successive links, each of said links having an endless configuration, said links having outer links respectively secured to said confronting ends of said one pair of confronting ends to provide multiple hinge action with reduced play in the split lock ring locked state and increased play in the split lock ring unlocked state; and
   (c) locking means fixedly secured to confronting ends of another pair of said pairs of confronting ends for releasably securing said split lock ring at said other pair of confronting ends.

2. A split lock ring for releasably securing a top plate, cover or stacking ring to the upper section of a bulk material container, said split lock ring comprising:
   (a) a split lock ring body comprising a plurality of arcuate segments, each of said arcuate segments having opposite ends, confronting opposite ends of successive arcuate segments of said arcuate segment providing a plurality of pairs of confronting ends;
   (b) a chain hinge fixedly secured to confronting ends of one pair of said pairs of confronting ends for providing a hinge for said split lock ring body at said one pair of confronting ends; and
   (c) locking means fixedly secured to confronting ends of another pair of said pairs of confronting ends for releasably securing said split lock ring at said other pair of confronting ends, said locking means comprising a plurality of lugs respectively fixedly secured to said confronting ends of said other pair of confronting ends and a bolt received by said lugs for releasably securing said split lock ring at said other pair of confronting ends, said bolt including a bolt head, one of said lugs being disposed adjacent said bolt head, said one lug being formed with a taper facing said volt head, said bolt head being formed with a taper facing said one lug, said taper formed on said bolt head conforming with the taper formed on said one lug, rotation of said bolt for releasably securing said split lock ring engages said bolt head and said one lug in a guided wedging action and provides a tangential alignment movement between said confronting ends of said other pair of confronting ends.

3. A split lock ring as claimed in claim 1 wherein said locking means comprises:
   (a) a plurality of lugs respectively fixedly secured to said confronting ends of said other pair of confronting ends;
   (b) a bolt received by said lugs for releasably securing said split lock ring at said other pair of confronting ends.

4. A split lock ring as claimed in claim 3 wherein said bolt includes a bolt head and wherein one of said lugs is disposed adjacent said bolt head, said one lug being formed with a taper facing said bolt head, said bolt head being formed on said bolt head conforming with the taper formed on said one lug, rotation of said bolt for releasably securing said split lock ring engages said bolt head and said one lug in a guided wedging action and provides a tangential alignment movement between said confronting ends of said other pair of confronting ends.

5. A split lock ring for releasably securing a top plate, cover or stacking ring to the upper section of a bulk material container, said split lock ring comprising:
   (a) a split lock ring body comprising a plurality of arcuate segments, each of said arcuate segments having opposite ends, confronting opposite ends of successive arcuate segments of said arcuate segments providing a plurality of pairs of confronting ends;

(b) a flexible arcuate band hinge secured to said split lock ring body about the circumference thereof overlying confronting ends of one pair of said pairs of confronting ends, said flexible arcuate band hinge extending about the circumference of said split lock ring body an angular distance of at least 180 degrees; and (c) locking means fixedly secured to confronting ends of another pair of said pairs of confronting ends for releasably securing said split lock ring at said other pair of confronting ends, (d) said locking means comprising:
   (a) a plurality of lugs respectively fixedly secured to said confronting ends of said other pair of confronting ends; and
   (b) a bolt received by said lugs for releasably securing said split lock ring at said other pair of confronting ends, said bolt including a bolt head and one of said lugs being disposed adjacent said bolt head, said one lug being formed with a taper facing said bolt head, said bolt head being formed with a taper facing said one lug, said taper formed on said bolt head conforming with the taper formed on said one lug, rotation of said bolt for releasably securing said split lock ring engages said bolt head and said one lug in a guided wedging action and provides a tangential alignment movement between said confronting ends of said other air of confronting ends.

6. A split lock ring for releasably securing a top plate, cover or stacking ring to the upper section of a bulk material container, said split lock ring comprising:

(a) a split lock ring body comprising at least three arcuate segments, each of said arcuate segments having opposite ends, confronting opposite ends of successive arcuate segments of said arcuate segments providing a plurality of pairs of confronting ends;

(b) locking means fixedly secured to confronting ends of one pair of said pairs of confronting ends for releasably securing said split lock ring at said one pair of confronting ends; and (c) a plurality of flexible arcuate band hinges secured to said split lock ring body in angularly spaced relation about the circumference thereof and overlying respectively the confronting ends of said pairs of confronting ends other than the confronting ends of said one pair of confronting ends, (d) said locking means comprising:
   (a) a plurality of lugs respectively fixedly secured to said confronting ends of said one pair of confronting ends to which said locking means is secured; and
   (b) a bolt received by said lugs for releasably securing said split lock ring at said one pair of confronting ends to which said locking means is secured, said bolt including a bolt head and wherein one of said lugs being disposed adjacent said bolt head, said locking means comprising spring means disposed between said one lug and said bolt head, said bolt further comprising a stem having an unthreaded section about which said spring means is coiled and about which said one lug is disposed, said spring means interengaging said one lug and said bolt head to provide a pressure release in response to said one lug being under a pressure exceeding a predetermined magnitude.

7. A split lock ring for releasably securing a top plate, cover or stacking ring to the upper section of a bulk material container, said split lock ring comprising:

(a) a split lock ring body comprising a plurality of arcuate segments, each of said arcuate segments having opposite ends, confronting opposite ends of successive arcuate segments of said arcuate segments providing a plurality of pairs of confronting ends;

(b) a chain hinge fixedly secured to confronting ends of one pair of said pairs of confronting ends for providing a hinge for said split lock ring body at said one pair of confronting ends; and (c) locking means fixedly secured to confronting ends of another pair of said pairs of confronting ends for releasably securing said split lock ring at said other pair of confronting ends, said locking means comprising a plurality of lugs respectively fixedly secured to said confronting ends of said other pair of confronting ends and a bolt received by said lugs for releasably securing said split lock ring at said other pair of confronting ends, said bolt including a bolt head, one of said lugs being disposed adjacent said bolt head, said locking means further comprising a washer disposed between said bolt head and said one lug, said bolt being received by said washer, said washer being formed with a taper facing said one lug, said one lug being formed with a taper facing said washer, said taper on said washer conforming with the taper formed on said one lug, rotation of said bolt for releasably securing said split lock ring draws together in succession said bolt head, said washer and said one lug for said one lug and said washer to engage one another in a guided wedging action for providing a tangential alignment movement between confronting ends of said other pair of confronting ends.

8. A split lock ring as claimed in claim 3 wherein said bolt includes a bolt head and wherein one of said lugs is disposed adjacent said bolt head, said locking means further comprising a washer disposed between said bolt head and said one lug, said bolt being received by said washer, said washer being formed with a taper facing said one lug, said one lug being formed with a taper facing said washer, said taper on said washer conforming with the taper formed on said one lug, rotation of said bolt for releasably securing said split lock ring draws together in succession said bolt head, said washer and said one lug for said one lug and said washer to engage one another in a guided wedging action for providing a tangential alignment movement between confronting ends of said other pair of confronting ends.

9. A split lock ring for releasably securing a top plate, cover or stacking ring to the upper section of a bulk material container, said split lock ring comprising:

(a) a split lock ring body comprising a plurality of arcuate segments, each of said arcuate segments having opposite ends, confronting opposite ends of successive arcuate segments of said arcuate segments providing a plurality of pairs of confronting ends;

(b) a flexible arcuate band hinge secured to said split lock ring body about the circumference thereof overlying confronting ends of one pair of said pairs of confronting ends, said flexible arcuate band hinge extending about the circumference of said split lock ring body an angular distance of at least 180 degrees; and (c) locking means fixedly secured to confronting ends of another pair of said pairs of confronting ends for releasably securing said split lock ring at said other pair of confronting ends, (d) said locking means comprising:
  (a) a plurality of lugs respectively fixedly secured to said confronting ends of said other pair of confronting ends; and
  (b) a bolt received by said lugs for releasably securing said split lock ring at said other pair of confronting ends, wherein said bolt includes a bolt head and wherein one of said lugs is disposed adjacent said bolt head, said locking means further comprising a washer disposed between said bolt head and said one lug, said bolt being received by said washer, said washer being formed with a taper facing said washer, said taper on said washer conforming with the taper formed on said one lug, rotation of said bolt for releasably securing said split lock ring draws together in succession said bolt head, said washer and said one lug for said one lug and said washer to engage one another in a guided wedging action for providing a tangential alignment movement between confronting ends of said other pair of confronting ends.

10. A split rock ring for releasably securing a top plate, cover or stacking ring to the upper section of a bulk material container, said split lock ring comprising:
p1 (a) a split lock ring body comprising at least three arcuate segments, each of said arcuate segments having opposite ends, confronting opposite ends of successive arcuate segments of said arcuate segments providing a plurality of pairs of confronting ends;
  (b) locking means fixedly secured and joined to confronting ends of one pair of said pairs of confronting ends for releasably securing said split lock ring at said one pair of confronting ends; and
  (c) a flexible arcuate band hinge secured to said split lock ring body about the circumference thereof overlying the confronting ends of said pairs of confronting ends other than the confronting ends of said one pair of confrontings ends;
  (d) said locking means comprising:
    (a) a plurality of lugs respectively fixedly secured to said confronting ends of said one pair of confronting ends to which said locking means is secured; and
    (b) a bolt received by said lugs for releasably securing said split lock ring at said one pair of confronting ends to which said locking means is secured, wherein said bolt includes a bolt head and wherein one of said lugs is disposed adjacent said bolt head, said locking means further comprising a washer disposed between said bolt head and said one lug, said bolt being received by said washer, said washer being formed with a taper facing said washer, said taper on said washer conforming with the taper formed on said one lug, rotation of said bolt for releasably securing said split lock ring draws together in succession said bolt head, said washer and said one lug for said one lug and said washer to engage one another in a guided wedging action for providing a tangential alignment movement between confronting ends of said other pair of confronting ends.

11. A split lock ring for releasably securing a top plate, cover or stacking ring to the upper section of a bulk material container, said split lock ring comprising:
p1 (a) a split lock ring body comprising at least three arcuate segments, each of said arcuate segments having opposite ends, confronting opposite ends of successive arcuate segments of said arcuate segments providing a plurality of pairs of confronting ends;
  (b) locking means fixedly secured and joined to confronting ends of one pair of said pairs of confronting ends for releasably securing said split lock ring at said one pair of confronting ends; and
  (c) a flexible arcuate band hinge secured to said split lock ring body about the circumference thereof overlying the confronting ends of said pairs of confronting ends other than the confronting ends of said one pair of confrontings ends;
  (d) said locking means comprising:
    (a) a plurality of lugs respectively fixedly secured to said confronting ends of said one pair of confronting ends to which said locking means is secured; and
    (b) a bolt received by said lugs for releasably securing said split lock ring at said one pair of confronting ends to which said locking means is secured, wherein said bolt includes a bolt head and wherein one of said lugs is disposed adjacent said bolt head, said one lug being formed with a taper facing said bolt head, said bolt head being formed with a taper facing said one lug, said taper formed on said bolt head conforming with the taper formed on said one lug, rotation of said bolt for releasably securing said split lock ring engages said bolt head and said one lug in a guided wedging action and provides tangential alignment movement between said confronting ends of said other pair of confronting ends.

* * * * *